United States Patent [19]

Calvo et al.

[11] Patent Number: 6,036,998

[45] Date of Patent: Mar. 14, 2000

[54] PROCESS FOR COLORING EPDM RUBBER TO PRODUCE GRANULES FOR BLENDING WITH POLYURETHANE RESINS OR TO USE BY THEMSELVES TO CREATE SAFETY AND ATHLETIC SURFACES

[75] Inventors: Luis M. Calvo, Bayshore; Steve Noskin, Dix Hills; Sansodeen Kahan, Brentwood, all of N.Y.; Matthew McWilliams, Danbury, Conn.

[73] Assignee: Polymer Plastics, Hauppauge, N.Y.

[21] Appl. No.: 08/902,305

[22] Filed: Jul. 29, 1997

[51] Int. Cl.[7] ....................................... B05D 7/00
[52] U.S. Cl. ................ 427/214; 427/222; 427/393.5; 427/322; 427/386
[58] Field of Search .................... 427/212, 214, 427/222, 393.5, 322, 386

[56] References Cited

U.S. PATENT DOCUMENTS

| | | |
|---|---|---|
| 3,908,043 | 9/1975 | Evans et al. .............................. 427/203 |
| 4,442,167 | 4/1984 | Iwasa et al. . |
| 4,614,686 | 9/1986 | Coke et al. .............................. 428/327 |
| 4,808,483 | 2/1989 | Nakasuji et al. ........................ 428/447 |
| 5,135,797 | 8/1992 | Sasaki . |
| 5,151,230 | 9/1992 | Damberg ................................. 264/83 |
| 5,543,172 | 8/1996 | Jakubisin ............................... 427/212 |
| 5,589,225 | 12/1996 | Yamada et al. ......................... 427/212 |

OTHER PUBLICATIONS

Perry, John H., ed. Chemical Engineers' Handbook, p. 21–38, 1963 (No Month).

Primary Examiner—Shrive Beck
Assistant Examiner—Paul D. Strain
Attorney, Agent, or Firm—Darby & Darby

[57] ABSTRACT

A method is disclosed for coloring ethylene-propylene diene monomer (EPDM) rubber granules for use in fabricating rubber products such as athletic surfaces. The method provides an efficient and cost effective method of coloring large quantities of EPDM rubber that provides a durable and permanent color coating on the EPDM rubber. The disclosed method may also be used for coloring other types of rubber or synthetic materials.

25 Claims, 3 Drawing Sheets

PROCESS FOR COLORING EPDM RUBBER TO PRODUCE GRANULES FOR BLENDING WITH POLYURETHANE RESINS OR TO USE BY THEMSELVES TO CREATE SAFETY AND ATHLETIC SURFACES

FIELD OF THE INVENTION

This invention relates generally to a process for coloring rubber, in particular, this invention relates to a process for coloring ethylene-propylene diene monomer (EPDM) rubber for use in fabricating flooring or other surfaces, particularly high performance surfaces such as athletic surfaces.

BACKGROUND OF THE INVENTION

EPDM rubber is a widely used form of synthetic rubber. EPDM rubber is created by the copolymerization of ethylene and propylene with the addition of a diene monomer. Adding a diene monomer, or other suitable unsaturated group, allows EPDM to be vulcanized with sulfur. Due to EPDM's absence of double carbon bonds, EPDM rubber exhibits tremendous resistance to aging and degradative agents such as hot and cold temperatures, oxygen, ozone, acid-base exposure and photooxidation. Due to these resilient properties, EPDM rubber is ideal for use in athletic surfaces, tires, seals, electrical and construction equipment.

A key ingredient in the formula of EPDM rubber is the filler compound carbon black. Carbon black is not an inert filler compound but instead enhances and reinforces various properties of EPDM rubber. While carbon black gives EPDM rubber many of its durable properties, carbon black also gives EPDM its black coloration. However, for commercial reasons, EPDM rubber is often required to be in colors other than black. Unfortunately, methods of coloring black EPDM rubber have proven to be difficult, time consuming and expensive.

For example, in fabricating athletic surfaces such as playground safety surfaces, carbon black EPDM is utilized due to its flexibility and weather resistant properties. However, for aesthetic reasons, there is a commercial demand for athletic surfaces in colors other than black. This requires coloring the EPDM rubber prior to fabricating the athletic surface. Due to the fact that known methods of coloring EPDM rubber are difficult and time consuming, colored athletic surfaces using EPDM rubber are much more expensive than black EPDM rubber surfaces.

For example, one common method of coloring EPDM rubber has been to substitute coloring fillers for carbon black such as calcium carbonate, clay and silicas. However, EPDM rubber compounded with fillers other than carbon black is rigid and less resilient to environmental degradation than carbon black EPDM. For example, non-carbon black EPDM rubber cannot be extruded into layers thinner than one millimeter. This compromises the flexibility and weather resistant properties of the EPDM rubber. Thus, coloration of EPDM rubber with replacement fillers other than carbon black has proven to be undesirable in that many of the advantageous properties of carbon black EPDM rubber are lost.

Another method of coloring carbon black EPDM rubber, described in U.S. Pat. No. 3,935,329, involves halogenating and painting the outer surface of EPDM rubber. However, halogenating the outer surface of EPDM causes delamination of the surface and subsequent loss of flexibility. As a result, the painted outer surface quickly deteriorates.

U.S. Pat. No. 4,442,167 ('167 patent) describes a method of coloring EPDM rubber wherein a thin layer of graft copolymer is added to the outer surface of carbon black EPDM rubber by extrusion molding. The additional layer of colored rubber polymer consists of non-carbon black EPDM rubber and vinyl chloride with coloring filler. As an alternative to combining the layers by extrusion molding, the '167 patent teaches the use of a foaming agent to bind the colored graft copolymer layer to the carbon black EPDM after vulcanization of the rubber. However, both methods are expensive and labor intensive. In addition, adding an outer layer of graft copolymer to an EPDM rubber surface requires the use of a dedicated extruder.

U.S. Pat. No. 5,135,797 describes a method of coloring EPDM rubber using a decorative film fused to the outer surface of the EPDM rubber. The decorative film consists of a substrate layer and a decorative layer which are bonded together by a third adhesive layer. The substrate layer is comprised of an ethylene/acrylic acid copolymer or acrylate copolymer. The decorative layer is formed from an ionomer or fluorine resin or a polyurethane film. However, the above method is flawed in that each layer must be added separately to the outer surface of the rubber substrate which is an extremely time consuming and tedious process.

Another method of coloring EPDM rubber is to simply paint the outer surface of the rubber by conventional methods. However, this results in an outer layer of paint that is rigid and incompatible with the underlying flexible rubber surface. As a result, the outer paint surface cracks and creases and quickly wears off.

The above methods of coloring EPDM rubber are inadequate for fabricating rubber products such as athletic surfaces in that they are either too expensive, too time consuming or simply ineffective. Consequently, there is a need for a cost effective and efficient method of coloring large quantities of EPDM rubber that leaves a permanent and viable coating or color on the outer surface of the rubber.

SUMMARY OF THE INVENTION

In accordance with the present invention, a method of coloring EPDM rubber is disclosed which is both efficient and cost effective. This invention relates to a method of coloring the surface of EPDM rubber granules in a manner which creates an outer or visible layer of color which is integral with the underlying EPDM rubber surface. The disclosed method provides a colored surface for EPDM rubber that neither creases nor cracks when the rubber substrate is flexed. In addition, the enclosed method of coloring EPDM allows for the coloring of several tons of EPDM rubber in a matter of hours and is therefore extremely cost effective.

It has now been discovered that EPDM granules can be colored by coating the granules with a paint or pigment, followed by a curing step, preferably by heating, which securely binds the paint to the rubber. Colored rubber surfaces, such as tiles, can then be fashioned from the colored granules, which retain the advantages of conventional EPDM surfaces while also having a highly economical, wear-resistant color finish. In accordance with a preferred embodiment of the present invention, EPDM rubber granules are loaded, preferably from a loading platform or loading dock, into a large stainless steel ribbon blender. Ideally, the ribbon blender is of a capacity to hold several tons of rubber granules at one time. Connected to the blender is a paint reservoir capable of holding large quantities of paint or other coloring substance. The reservoir is directly connected to the blender by a conduit which delivers paint to the ribbon blender at high pressure. Once the rubber granules are loaded and the ribbon blender activated, the ribbon blender acts to mix the paint with the rubber granules thereby coating and coloring the surface of the EPDM rubber granules. Surface treatments with silanes, titanates and zirconates can enhance the adhesion of the rubber to the coating (see Example #1).

After the rubber granules are coated, they are transferred by conveyor from the ribbon blender through a large elongated tunnel oven, where they are heated at high temperatures for approximately one hour.

After the granules have been heated through the tunnel oven, they are conveyed to a mixer unit where they are loosened, breaking up any coalesced chunks of rubber granules. The mixer unit is located at the end of the conveyor system beyond the tunnel oven. Once the coated granules are separated, the granules can be bagged and the colored granules can be used to produce colored EPDM rubber products. For example, in fabricating athletic surfaces, the colored EPDM rubber granules may be mixed with a polyurethane binding resin and molded into EPDM rubber tiles for creating a cushioned athletic or safety surface or the colored granules of the shreddings can be used by themselves as playground surfacing.

This method of coloring EPDM rubber allows for the coloring of several tons of rubber in a matter of hours resulting in a savings of at least 30% over many prior art methods. In addition, this method is not limited to coloring EPDM rubber but may be used with any rubber or synthetic material.

Thus, the invention provides a fast and inexpensive method of coloring EPDM rubber. These and other advantages will become apparent from the detailed description of the drawings which follow, considered together with the appended drawings.

DESCRIPTIONS OF THE DRAWINGS

In the drawings, which constitute part of this specification, embodiments demonstrating various features of the invention are set forth as follows.

DETAILED DESCRIPTION OF THE INVENTION

Although detailed illustrative embodiments are disclosed herein, other suitable structures and machines for practicing the invention may be employed and will be apparent to persons of ordinary skill in the art. Consequently, specific structural and functional details disclosed herein are representative only; they describe the preferred embodiments of the invention.

The EPDM rubber is preferably in the form of rubber granules or particles created from scrap EPDM rubber. Ideally, the rubber granules should be in the range of 0.5 to 4 millimeters in diameter. For specifically creating colored granules for use in fabricating athletic surfaces, the granules should preferably be in the range of 1 to 4 millimeters in diameter.

Figures 1, 1A, 1B:
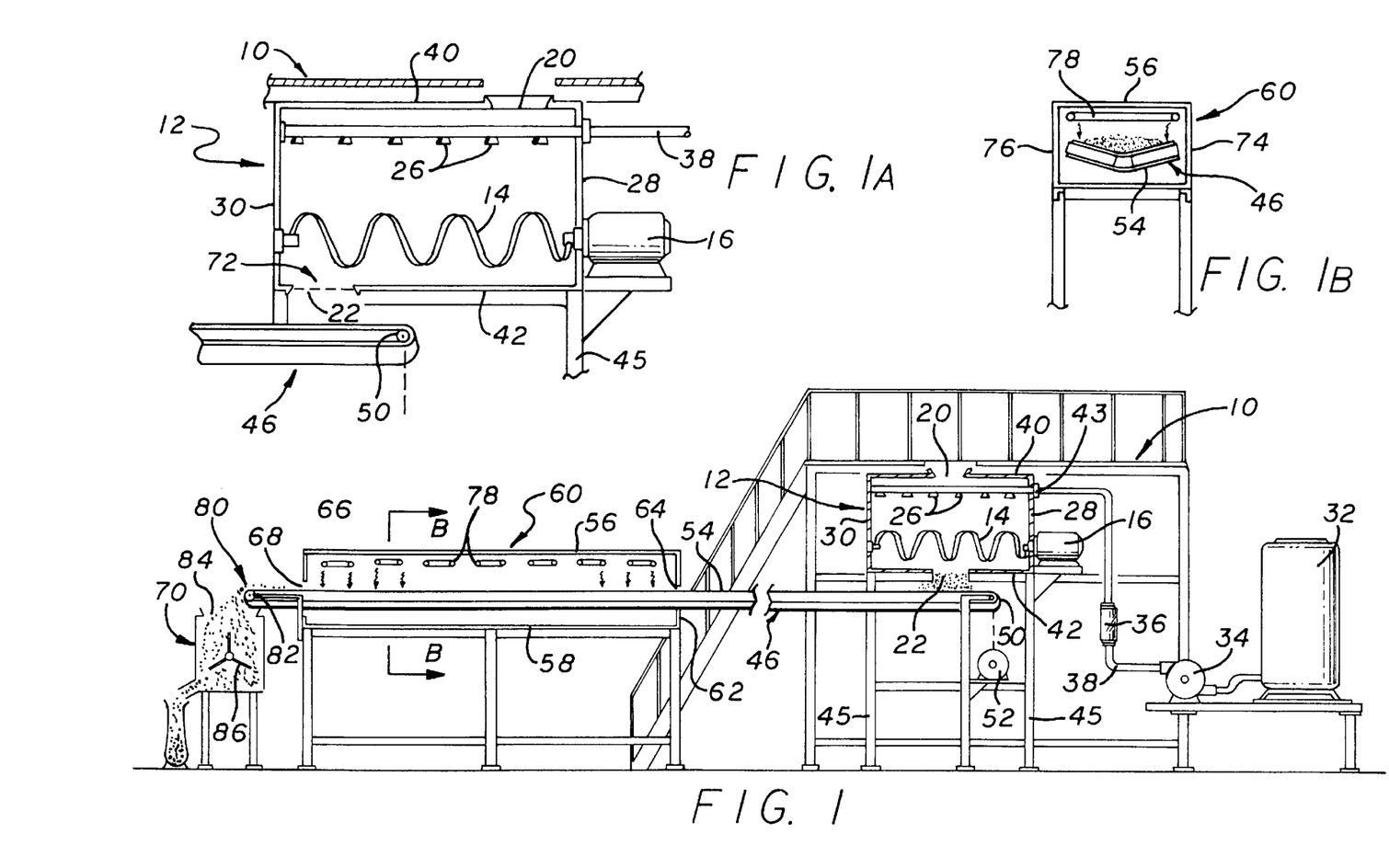
FIG. 1 is a perspective view of an apparatus for carrying for carrying out the disclosed method.
FIG. 1A is an alternate embodiment of the ribbon blender showing side top and bottom openings.
FIG. 1B is a cross sectional view of the tunnel oven.
Figure 2:
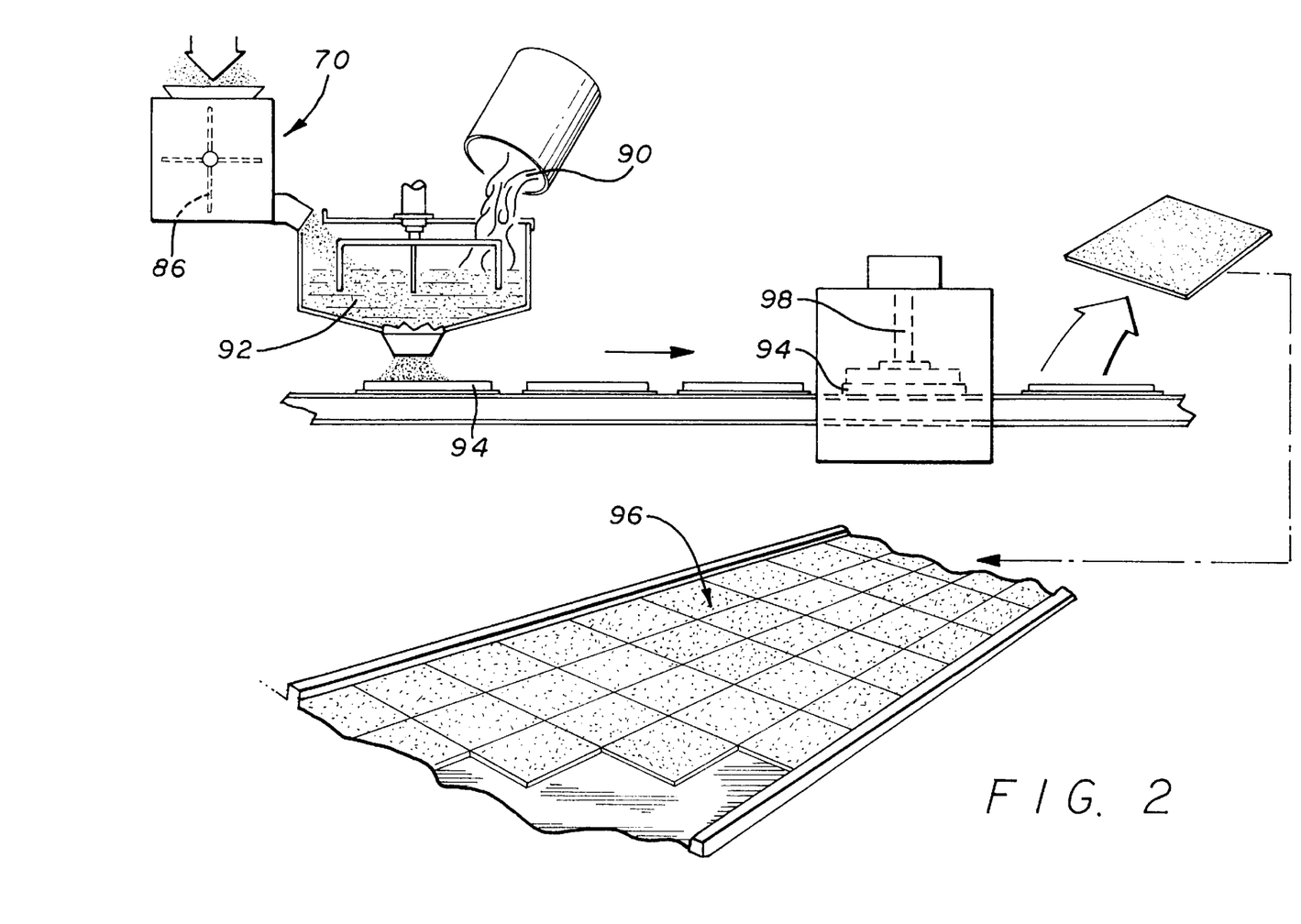
FIG. 2 is diagrammatical representation of the steps for fabricating polyurethane-EPDM tiles.

The rubber granules are loaded into a ribbon blender 12 as shown in FIGS. 1 and 2. For commercial applications, the ribbon blender 12 should be large enough to hold several tons of rubber granules at one time; however, depending upon the desired results, a smaller blender could be utilized. Ideally, the ribbon blender 12 is approximately sixty to ninety cubic feet which allows it hold approximately two to four tons of rubber granules. Commercial ribbon blenders of this kind are known, and can be obtained, for example, from Ross Inc. located in Hauppauge, N.Y.

Ribbon blender 12 is elongated and horizontally disposed as shown in FIG. 1. The blender 12 has a first square end 28 and a second square end 30 with elongated rectangular walls extending therebetween forming front and rear vertically disposed surfaces. The blender 12 has a top planar surface 40 and a bottom planar surface 42 with legs 45 extending from the bottom planar surface 42 of the blender 12 to the ground. The legs 45 must be of sufficient size and strength to suspend the blender 12 above the conveyor system 46, which is positioned directly below the bottom surface 42 of blender 12.

Preferably, the ribbon blender 12 consists of stainless steel which provides for a more durable and longer lasting blender. As shown in FIG. 1, inside the blender 12 and extending throughout its length, is a horizontally disposed stainless steel ribbon 14 which is rotatably mounted between the first 28 and second 30 square ends of blender 12. The ribbon 14 is suspended between ends 28 and 30 to allow complete freedom of movement as the ribbon 14 rotates.

Attached adjacent the outer surface of the first square end 28 of the blender 12 is motor unit 16. Motor unit 16 is a variable speed motor preferably in the range of 25 to 40 horse power. Motor unit 16 is attached to the outer surface of the first square end 28 and is operatively connected to ribbon 14 through first square end 28. The motor unit 16 rotates ribbon 14 clockwise within blender 12, in a manner similar to a rotating cork screw.

The EPDM rubber granules are loaded from a platform or loading dock 10 adjacent to the ribbon blender 12. The granules may be loaded manually or by conveyor (not shown). If the rubber granules are to be manually loaded into blender 12, the platform 10 should be positioned so that the top surface of platform 10 is level with or above the top planar surface 40 of ribbon blender 12. This is to ensure that the rubber granules can be easily loaded from platform 10 into the blender 12. In that regard, the blender 12 should be positioned adjacent to the edge of the platform 10.

Located along the top surface 40 of blender 12 is an opening 20 for receiving the rubber granules from platform 10. In one embodiment of the ribbon blender disclosed in the present application, opening 20 is located in the middle of the blender 12 and the bottom opening 22 is located directly below the top opening 20 in the middle of bottom surface 42. This is shown in FIG. 1. Alternatively, opening 20 can also be located adjacent first square end 28 of the ribbon blender 12 with opening 22 located at the second square end 30 as shown in FIG. 1A. In this embodiment, the EPDM granules travel the length of the blender 12 while being coated.

Once the granules are loaded in blender 12, the motor unit 16 is activated at a speed sufficient to evenly distribute the rubber granules within the blender 12. Although not required, it is preferable to obtain an even distribution of the rubber granules within the blender 12 before the painting or coloring step.

Located apart from the ribbon blender 12 is tank 32 which serves as a reservoir to hold the coloring substance which is to be delivered to ribbon blender 12. Tank 32 is connected to the ribbon blender 12 by conduit 38 which delivers the paint or other coloring substance to the ribbon blender 12. A pump 34 is utilized for moving the coloring substance from tank 32 through conduit 38 to the blender 12. Pump 34 may be placed in any suitable location, and for purposes of illustration is located approximately half way between the tank 32 and the ribbon blender 12 (See FIG. 1). Additionally, a volume meter 36 can be located along the conduit 38 for measuring the volume of coloring substance pumped from tank 32 to the ribbon blender 12.

Any coloring substance may be utilized for coloring the surface of the rubber granules. Preferred paints should be light insensitive and include acrylics, epoxies, urethanes, epoxy esters and any other stable polymer based paint. To enhance the adhesion of the paint to the EPDM granules, silanes, titanates, or zirconates may be added to the blender prior to mixing with paint. The preferred viscosity of the paint is around 5–10 kcps at 75° C. Particularly preferred paints are acrylics and urethanes.

Conduit opening 43 is located near the intersection of top surface 40 and first square end 28. Conduit opening 43 provides an aperture within square end 28 through which conduit 38 extends. Conduit 38, as shown in FIG. 1, extends from tank 32 through conduit opening 43 and into the interior of blender 12. From conduit opening 43, the conduit 38 extends the entire length of blender 12 between the first and second square ends 28 and 30, running beneath and parallel to top surface 40. The conduit 38 is suspended horizontally across the blender 12 and is attached to second square end 30 which serves to support conduit 38.

Regularly spaced along the length of conduit 38, within blender 12, are sprayer heads 26 which serve to deliver the coloring substance at high pressure to the rubber granules located below. As an alternative to sprayer heads, nozzles, hoses, aerosolizers or any other spraying means could be utilized. Suitable nozzles include Ross Inc. nozzles (Hauppauge, N.Y.) and can range in size from 10 milliliters to 100 milliliters. Preferably, the paint is sprayed at a pressure of 5 to 20 PSI.

Pump 34 delivers the coloring substance, such as paint, from tank 32 through conduit 38 and into blender 12. The pump 34 must be of sufficient power to enable the coloring substance to be pumped through conduit 38 which vertically upturns along first square end 28 prior to entering blender 12. The paint is sprayed from sprayer heads 26 with sufficient pressure to propel the paint in an outwardly growing arc when exiting sprayer heads 26. This is required to ensure that the rubber granules are evenly coated as they are churned by ribbon 14. Thus, pump 34 must be of sufficient size and power to deliver the coloring substance to the blender 12 at very high pressures.

The amount of paint or other coloring substance that is required to be added depends on the material to be colored. However, generally, the amount of paint or coloring substance needed to successfully coat rubber is 1–15% of paint based on the weight of the rubber. For EPDM rubber, 8% of paint based on the weight of EPDM rubber is adequate.

Once the EPDM is loaded into the blender 12 and the motor unit 16 activated, the ribbon blender 12 is started at approximately 15 revolutions per minute to allow for sufficient blending of the rubber and the paint. This has two effects: first, it evenly distributes the EPDM granules throughout the blender 12 causing the granules to move through the blender from the first square end 28 to the second square end 30; second, once the spraying step begins, the rotation of the ribbon 14 causes the rubber granules to be churned under the paint heads causing maximum exposure to the outer surfaces of the granules. Therefore, immediately after the ribbon 14 begins rotating, paint is delivered from tank 32 through sprayer heads 26 which coats the rubber granules as the ribbon 14 rotates. Generally, 5–10 minutes of blending while the spray heads 26 are activated will uniformly coat the rubber granules.

Although EPDM rubber is cited throughout as the substrate to which the coating is applied, the described system may be utilized for other types of rubber and synthetic materials. For example, the described method and apparatus can be used for coating any type of synthetic and natural rubber, such as styrene-butadiene rubber.

Positioned beneath the bottom surface 42 of the ribbon blender 12 is conveyor 46, which extends through a tunnel oven 60 to a mixing unit 70. Conveyor 46 is horizontally disposed to ensure that the granules remain on the conveyor 46 as it moves. The conveyor 46 is approximately 50 to 70 feet long and has a first end comprised of a rotating cylinder 50, which is powered by a motor unit 52. Conveyor belt 54 wraps around the rotating cylinder 50 which turns the conveyor belt 54 as it passes through tunnel oven 60.

Extending through bottom surface 42 of blender 12 is bottom opening 22. During operation of the blender 12, opening 22 is sealed shut by door 72 (shown in phantom). Opening 22 is positioned in the middle of bottom surface 42 directly below opening 20 as shown in FIG. 1. Opening 22 may also be located adjacent the second square end 30 as shown in FIG. 1A.

The width of the conveyor belt 54 is significantly wider than the opening 22 to ensure conveyor belt 54 catches the coated granules as they fall from opening 22 to conveyor belt 54. In addition, the outer edges of conveyor belt 54 are tapered upwards to prevent the rubber granules from spilling as the conveyor belt 54 moves through the tunnel oven 60 to the mixer unit 70.

After the rubber granules have been sufficiently coated inside blender 12, door 72 may be opened, which causes the coated granules to fall from ribbon blender 12 onto conveyor belt 54. Door 72 may be a sliding door which opens parallel to the bottom surface of the blender 12 and is activated by a remote switch. Alternatively, door 72 may swing downwardly open.

To provide for a smooth transition of the coated granules from blender 12 to conveyor belt 54, the rotational velocity of ribbon 14 is synchronized to match the speed of conveyor belt 54. That is, the rate of coated granules leaving the ribbon blender 12 should not exceed the capacity of the conveyor belt 54 to receive the granules. To ensure that this is the case, the ribbon 14, which is powered by a variable speed motor unit 16, can be set at a low speed to match the speed of the conveyor belt 54 as it moves through tunnel oven 60. Another manner of accomplishing this is to periodically open and shut door 72 to ensure that there is no excess loading of granules on conveyor belt 54. Thus, as conveyor belt 54 receives the coated granules from blender 12, the belt 54 slowly moves through tunnel oven 60.

Tunnel oven 60 is approximately fifteen to twenty feet long and has a first side 62 with an opening 64 for receiving conveyor belt 54 and a second side 66 with an opening 68 from which conveyor belt 54 exits. The oven 60 has an upper surface 56, a lower surface 58 with a front side wall 74 and a rear side wall 76 extending therebetween, forming a nearly complete enclosure. Located inside oven 60 is heating coil 78 which extends the entire length of oven 60. The electric heating coil 78 is positioned between conveyor belt 54 and the upper surface 56 of oven 60. The coil 78 extends downward from the upper surface 56 of oven 60 or, in the alternative, can be placed below conveyor belt 54. A rear cross-sectional view of tunnel oven 60 is shown in FIG. 1B.

The internal temperature of the oven should be approximately 450 degrees Fahrenheit for properly setting the paint or coloring on the rubber granules as the granules move through the tunnel oven 60. Conveyor belt 54 moves at an appropriate speed through oven 60 so as to expose the rubber granules to the inside temperatures of the oven 60 for approximately one hour. Thus, in a twenty foot long oven, the conveyor should move at a speed of approximately one foot every three minutes. It is also important to note that conveyor belt 54 should be comprised of a material which is able to repeatedly withstand the high temperatures of oven 60.

The internal temperatures of the oven 60 causes the paint to dry quickly and creates a bond between the paint and the outer surface. This creates a permanent coloring of EPDM rubber which is durable and long lasting.

The rubber granules are carried through the oven 60 by the conveyor belt 54 and exit through the second opening 68 of the oven. As shown in FIG. 1, at the second end 80 of the conveyor 46 is a second rotating cylinder 82. Conveyor belt 54 wraps around cylinder 82 and returns back through tunnel oven 60 toward rotating cylinder 50. Second rotating cylinder 82 is an inactive cylinder without attachment to a separate motor unit. The second cylinder 82 is powered by the movement of conveyor belt 54.

At the second end 80 of conveyor belt 46 is a mixer unit 70 which receives the granules from conveyor belt 54. The mixer unit 70 has an opening 84 for receiving the granules from conveyor 46. Because the granules are heated in tunnel oven 60 at very high temperatures, the granules often coalesce to form large chunks which require breaking down to separate the granules. Mixer unit 70 has a mechanism 86 which may be a propeller, a grinding wheel, a rotary blade or other means for breaking down the chunks of granules to their original size. Separating the coated granules ensures that the granules are ready for use in fabricating rubber products. In addition, the mixer unit 70 may operate as a bagger which serves to bag the coated granules in separate 55 pound bags.

For fabricating athletic surfaces, safety surfaces and cushioned rubber flooring surfaces, polyurethane resin is blended with the colored EPDM granules. Commercially available polyurethane resins such as "VITRITURF BINDER WINTER GRADE", "VITRITURF BINDER SUMMER GRADE" and "VITRITURF BINDER ALIPHATIC" available from Vitricon Inc. of Hauppauge, N.Y. may be utilized. "VITRITURF BINDER WINTER GRADE" is a low viscosity aromatic polyurethane resin and is especially recommended for use when temperatures are between 32–60° Fahrenheit. In addition, "VITRITURF BINDER WINTER GRADE" can be used as a primer for all Vitriturf binders at any temperatures.

"VITRITURF BINDER SUMMER GRADE" is an aromatic resin and is recommended when forming athletic surfaces in temperatures above 60° Fahrenheit. "VITRITURF BINDER ALIPHATIC" can be used when the temperatures are at a minimum of 60° Fahrenheit. "VITRITURF BINDER ALIPHATIC" should be used when color stability of the rubber granules is important.

As shown in FIG. 2, the colored EPDM granules are blended with the polyurethane resin 90 at the approximate ratio of 100 pounds of EPDM granules per 1 gallon of resin. The mixture 92 should be blended well to ensure homogeneity. The following examples demonstrate the steps of coloring rubber granules.

EXAMPLE #1

Approximately two tons of 1–3 mm in diameter EPDM rubber granules were added into a ribbon blender of approximately 60 to 90 cubic feet in capacity. The ribbon blender was manufactured by Ross Inc., of Hauppauge, N.k. Ten percent (10%) Ken React Lica 12 WE 33 titanate water surface treatment, available from Kenrich Chemical located in Bayonne, N.J. was added to the blender at a proportion of 1 part per weight titanate water surface treatment to EPDM rubber for the purpose of preparing the EPDM rubber granules for coating. The titanate water surface treatment improves the adhesion of the coating to the EPDM rubber surface. The EPDM rubber and titanate water surface treatment were mixed in the ribbon blender for approximately 2 minutes until a homogenous mixture was obtained.

PolyFlor Green acrylic coating available from Polymer Plastics located in Hauppauge, N.Y. was added to the blender at 10 parts per weight of coating per weight of EPDM rubber. The PolyFlor Green coating and EPDM rubber were blended for approximately 10 minutes until the EPDM rubber was sufficiently coated.

After the EPDM rubber was coated, the coated granules were conveyed to a tunnel oven by a conveyor and heated at 425° F. for approximately one hour to dry the paint thereby providing a permanent coated surface for the EPDM granules.

The coated granules coated of this Example showed much better adhesion of the acrylic paint to the outer surface of the EPDM rubber granules than coated EPDM rubber granules untreated with titanate.

EXAMPLE #2

Approximately two tons of styrene-butadiene rubber (SBR) shreddings from recycled tires of approximately ½ inch in diameter was added to a ribbon blender of approximately 60–90 cubic feet in capacity. The ribbon blender was manufactured by Ross Inc., of Hauppauge, N.Y. A 10% solution of Union Carbide Silane A-1100 in Xylene at a proportion of 1 part per 100 of SBR shreddings were added into the blender and mixed for approximately 2 minutes until a homogenous mixture was obtained. PolyFlor Green acrylic coating from Polymer Plastics located in Hauppauge, N.Y. was then added to the blender at a proportion of 10 parts of coating per 100 parts of rubber. The SBR shreddings and coating were mixed in the blender for approximately 10 minutes until the SBR shreddings obtained a complete coating on their outer surface.

After the SBR shreddings were adequately coated, they were conveyed to a tunnel oven and dried at 425° F. for approximately 1 hour to set the coating. As in Example #1, a durable and permanent outer coating for the SBR shreddings was obtained.

Once the EPDM rubber granules are formed and coated, they are generally not placed directly on the ground surface although it is possible to do so. Instead, a primer surface consisting of SBR buffings binded with polyurethane resin is made to serve as a ground surface layer or primer surface. The EPDM rubber surface is then added to the SBR primer surface to serve as a wearing course.

In forming the primer surface, the binders ("VITRITURF BINDER SUMMER GRADE", "VITRITURF BINDER WINTER GRADE", "VITRITURF BINDER ALIPHATIC") are added to the SBR buffings at the rate of 1⅛ gallons of binder per 50 lbs. of buffings. Deviations from this mixture ratio can result in a very dry product which can easily crumble or fail. Equally important is to ensure thorough mixing during the application. The binder/buffing blend is troweled at a predetermined thickness to meet ASTM F Impact Absorption Parameters (see table below).

However, even prior to forming a primer surface, the ground area underneath the primer surface should be primed. Priming is important to ensure proper substrate wetting and bonding. Vitriturf systems installed without a primer can result in the primer surface debonding or "bubbling up." Priming the ground surface is usually done with "VITRITURF BINDER WINTER GRADE" due to its low viscosity, but other binders may be used. The primer should be added to the ground surface at a ratio of approximately one gallon per 250 square feet. If the ground surface consists of sand or gravel, soil stabilizers may be used such as "POLYMER SS" available from Vitriturf in Hauppauge, N.Y. The primer surface (SBR buffings with binder) is to be added after the initial primer has become tacky, approximately 20 minutes after its application.

To obtain a uniform primer surface, the surface should be troweled. For smoothing the primer surface, the trowel can be wiped with a rag soaked in diesel fuel. It is important not to use an excessive amount of diesel fuel, but enough should be applied so that the trowel is fully coated. Once the primer surface has dried, prime the upper surface once again with binder. This will ensure adhesion of the wearing course. The binder should be applied this second time at a ratio of one gallon of binder to 250 square feet of surface. Allow 20 minutes for the binder to become tacky before adding the colored EPDM rubber wearing course.

In forming the EPDM rubber granule—polyurethane blend, the binder should be blended with the colored EPDM granules at a ratio of approximately 1.25 gallons of binder per 10 gallons of EPDM rubber granules. The EPDM rubber granules are expressed here in terms of volume due to the fact that the EPDM rubber granules are poured for blending from two five-gallon pails. The EPDM granules are not to be compacted in the pails prior to blending. One 50 lb. bag of EPDM granules should fill approximately two five-gallon pails. Also, it is important that the surface of the EPDM granules be clean before mixing with binder. Thus, a light application of water to clean the granules prior to blending with the binder may be required. However, if the granules are cleaned, they should be allowed to completely dry before blending.

The EPDM rubber granules are then mixed with the binder. After initial blending, allow 2–3 minutes of induction time followed by remixing. This will ensure proper binder retention during application. All dry spots on the rubber granules should be eliminated by thorough mixing.

In one method of applying the wearing course, the polyurethane-EPDM mixture is advantageously poured into a two foot by two foot precasted mold 94 to create EPDM rubber tiles as shown in FIG. 2. Thus the tiles should be approximately one-half inch in thickness; however, other thicknesses are possible. Once the polyurethane-EPDM mixture is poured in the mold 94, the tile is artificially cured by applying 120–140° F. for one hour under 10 to 50 psi by a press mold 98. After the tiles are cured, they are removed from the mold and can be used to create the wearing course 96. The tiles are joined in a lock-in-place method as shown in FIG. 2 over the primer surface until an even surface is formed.

It is important that the overall thickness of the athletic safety surface meet the ASTM F 1292-93 Impact Absorption Parameters which are disclosed in the table below:

|                              | Fall Height (feet) | |
| ---------------------------- | --- | --- |
| Surface Thickness (inches)   | Hard Base | Stone Base |
| 1¾                           | 4  | 4  |
| 2                            | 5  | 5  |
| 2½                           | 6  | 4  |
| 3                            | 7  | 7  |
| 3½                           | 8  | 8  |
| 4                            | 9  | 9  |
| 4½                           | 10 | 10 |

Thus, depending on the height of the playground apparatus above the safety surface, the thickness of the surface should be varied accordingly by utilizing the ASTM F 1292-93 Impact Absorption Parameters.

Figure 3:
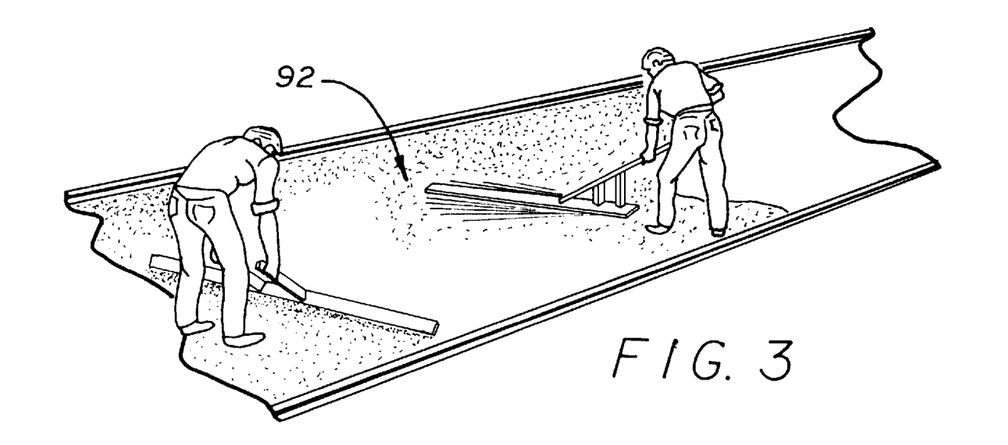
FIG. 3 is a perspective view of forming an athletic surface over a primer surface using the "poured in place" method.

EPDM wearing courses can also be fabricated by a "poured in place method" as shown in FIG. 3. In the "poured in place method," rather than forming tiles in precasted molds, the blended polyurethane-EPDM mixture is simply poured over a primer surface to form a smooth polyurethane-EPDM surface. The desired thickness of the athletic surface is obtained by pouring the appropriate amount of polyurethane-EPDM mixture over the primer surface and troweling. The polyurethane-EPDM mixture should be troweled tight to ensure good compaction. Applying diesel fuel to the trowel can also be used in the "poured in place" method to provide a smooth wearing course.

The wearing course alone should have a thickness of no less than ⅜ inches to ensure that the wearing course does not wear prematurely. A typical thickness for the wearing course is one-half inch.

At high wear areas, such as under slides and swings, whether using tiles or the "poured in place" method, the wearing course should be thicker. For example, it is recommended that the tiles be at least ¾ of an inch thick in these areas. The tiles can be tapered at their edges to form a gradual descent to the surface areas away from the playground apparatus. Similarly, with the "poured in place" method, these areas should be thicker and tapered to provide a gradual transition. Also, once dried, the wearing course can have additional binder applied to provide extra durability.

After a smooth polyurethane-EPDM surface is created, the polyurethane-EPDM mixture is then allowed to dry forming a solid EPDM rubber surface. Light water spraying of the surface will help cure the binder. Lower temperatures and low humidity can slow the curing rate of the binder. To speed up the curing process, two ounces of accelerator per gallon of binder can be used. However, an accelerator should not be used with aliphatic binders. Under normal conditions (70° F. and 60% relative humidity), a three-day curing time would be ideal for allowing the surface to cure.

An advantage of the "poured in place" method over fabricating the athletic surfaces with tiles is that tiled surfaces leave seams while flooring surfaces created by the "poured in place" method are seamless. Thus, in certain circumstances, the "poured in place" method may be preferable.

Figure 4:
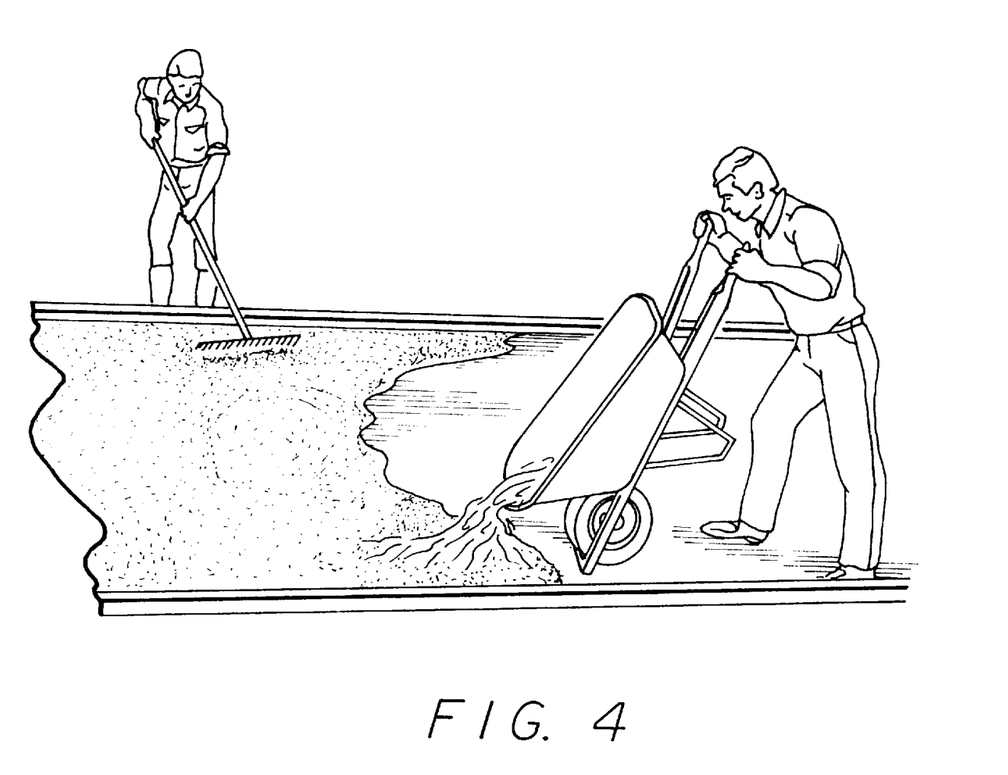
FIG. 4 is a perspective view of forming an athletic surface without using a polyurethane blend.

In addition, as shown in FIG. 4, athletic surfaces can be formed by simply utilizing the EPDM rubber granules by themselves without the use of polyurethane binder resin. In this method, an athletic surface is formed by spreading out EPDM rubber granules loose over a primer surface and troweling.

An inexpensive and efficient method of coloring EPDM is provided that allows for large quantities of EPDM rubber to be colored quickly and reliably. The method of the present invention may be readily incorporated in various embodiments to carry out the stated method. The various components and processes disclosed herein are merely exemplary, and various alternative components and techniques may be employed from those disclosed and suggested herein. Consequently, it is to be understood that the scope hereof should be determined in accordance with the claims as set forth below.

What is claimed is:

1. A method for coloring carbon black EPDM rubber comprising the following steps:
    providing carbon black EPDM rubber;
    providing a non-water based paint selected from the group consisting of: epoxics, urethanes, and epoxy esters;
    providing a blender having a top surface, a bottom surface and side surfaces extending between the top and bottom surfaces;
    adding the carbon black EPDM rubber to the blender;
    treating the carbon black rubber prior to coloring with a treatment material selected from the group consisting of: silanes, titanates, and zirconates
    adding the paint to the blender;
    mixing the paint and EPDM rubber in the blender thereby coating the rubber with the coloring substance;
    conveying the coated rubber to a heating chamber; and,
    heating the coated rubber to set the coloring substance on the rubber.

2. The method of claim 1 wherein the carbon black EPDM rubber is in the form of rubber granules.

3. The method of claim 1 wherein the blender has a mixing means.

4. The method of claim 3 wherein the blender is a ribbon blender and the mixing means is a steel ribbon which rotates within the blender.

5. The method of claim 1 wherein the heating chamber comprises a tunnel oven.

6. The method of claim 5 wherein the coated rubber is heated in the tunnel oven between 30 minutes and 90 minutes at an internal oven temperature of approximately 450 degrees Fahrenheit.

7. The method of claim 1 wherein a mixing unit comprising a propeller is provided for separating the rubber after the rubber is heated in the mixing chamber.

8. The method of claim 1 wherein the coloring substance is stored in a reservoir tank detached from the blender and is delivered to the blender through a conduit extending between the reservoir tank and the blender.

9. A method for coloring carbon black EPDM rubber comprising the following steps:
    providing carbon black EPDM rubber;
    providing a non-water based paint selected from the group consisting of: epoxics, urethanes, and epoxy ester for coloring the carbon black EPDM rubber;
    providing a blender for blending the carbon black EPDM rubber and paint together;
    providing a conveyor system positioned adjacent the blender;
    adding the carbon black EPDM rubber to the blender;
    treating the carbon black EPDM rubber prior to coloring with one of the following: silanes, titanates and zirconates
    adding the paint to the blender;
    blending the paint and the carbonblack EPDM rubber together thereby coating the carbon black EPDM rubber with the paint;
    releasing the carbon black EPDM rubber from the blender to the conveyor;
    conveying the carbon black EPDM rubber to a tunnel oven for heating the coated synthetic material;
    heating the carbonblack EPDM rubber in the tunnel oven;
    conveying the carbonblack EPDM rubber from the tunnel oven to a mixer unit; and, separating agglomerated coated granules in the mixer unit.

10. The method of claim 9 wherein the synthetic material is EPDM rubber granules.

11. The method of claim 9 wherein the coloring substance and the synthetic material are added to the blender simultaneously.

12. The method of claim 9 wherein the blender is a stainless steel ribbon blender.

13. The method of claim 9 wherein a rotating steel ribbon is located within the blender, the steel ribbon being operatively connected to a motor unit for rotating within the blender thereby mixing the synthetic material and the coloring substance together.

14. The method of claim 9 wherein the synthetic material is heated within the tunnel oven for approximately one hour at internal oven temperatures of approximately 450 degrees Fahrenheit.

15. The method of claim 9 wherein the coated granules are mixed with polyurethane at a mixture of approximately 1.25 gallons of EPDM rubber for 10 gallons of polyurethane and troweled over a primer surface to form an athletic surface.

16. The method of claim 9 wherein the coated granules are mixed with polyurethane and placed in precasted molds and heated under pressure to cure the EPDM-polyurethane to form precasted EPDM rubber tiles.

17. The method of claim 9 wherein the blender has a conduit in a fixed position extending through the entire length of its interior.

18. The method of claim 17 wherein the conduit has sprayer heads extending therefrom and the conduit is in a fixed position within the blender for spraying the paint at a temperature of approximately 75 degrees Celsius when sprayed on the carbon black EPDM rubber.

19. A method of fabricating carbon black EPDM rubber surfaces comprising the following steps:
    providing carbon black EPDM rubber;
    treating the carbon black EPDM rubber prior to coloring by coating with one of the following: silanes; titanates and zirconates
    providing a non-water based paint;
    providing a ribbon blender with a top surface and a bottom surface and side surfaces extending between the top and bottom surfaces thereby forming an enclosure;
    the blender having a separating means for spraying the paint within the blender and a mixing means for mixing the carbon black EPDM rubber and paint together;
    releasing the coated EPDM rubber from the blender to the conveyor system;
    the conveyor system conveying the coated EPDM rubber to a tunnel oven for heating the coated EPDM rubber;
    heating the coated EPDM rubber in the tunnel oven;

providing a mixer unit for receiving the coated EPDM rubber from the conveyor system;

conveying the coated EPDM rubber from the tunnel oven to the mixer unit; and, separating the coated EPDM rubber with the mixer unit.

20. The method according to claim 19 further including the following steps:

providing polyurethane resin;

mixing the polyurethane resin and coated EPDM rubber together at a mixture of approximately 1.25 gallons of EPDM rubber for 10 gallons of polyurethane to form a polyurethane-EPDM rubber mixture into athletic surface tiles; and, curing the mold under heat and pressure thereby forming colored EPDM athletic surface tiles.

21. The method according to claim 19 further including:

providing polyurethane resin;

mixing the polyurethane resin and the coated EPDM rubber together at a ratio of approximately 1.25 gallons of binder per 10 gallons of EPDM rubber together to form a polyurethane-EPDM rubber mixture; and, covering a surface with the polyurethane-EPDM rubber mixture thereby forming an athletic surface.

22. The method according to claim 19 further including covering said EPDM granules over a surface.

23. The method of claim 19 wherein the EPDM rubber is in the form of rubber granules.

24. The method of claim 19 wherein the paint chosen from the following group: acrylic paint; epoxy paint; urethane paint; and epoxy ester paint.

25. The method of claim 19 wherein the coated rubber is heated in the tunnel oven for approximately one hour at internal oven temperatures of approximately 450 degrees Fahrenheit.

* * * * *